(12) United States Patent
Strehle

(10) Patent No.: US 10,940,841 B2
(45) Date of Patent: Mar. 9, 2021

(54) METHOD AND CONTROL UNIT FOR CONTROLLING A HYDRAULIC BRAKING SYSTEM

(71) Applicant: Robert Bosch GmbH, Stuttgart (DE)

(72) Inventor: Alfred Strehle, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 318 days.

(21) Appl. No.: 15/781,640

(22) PCT Filed: Oct. 12, 2016

(86) PCT No.: PCT/EP2016/074465
§ 371 (c)(1),
(2) Date: Jun. 5, 2018

(87) PCT Pub. No.: WO2017/097465
PCT Pub. Date: Jun. 15, 2017

(65) Prior Publication Data
US 2020/0223413 A1 Jul. 16, 2020

(30) Foreign Application Priority Data
Dec. 8, 2015 (DE) .......................... 102015224601.9

(51) Int. Cl.
*B60T 8/94* (2006.01)
*B60T 8/32* (2006.01)
(Continued)

(52) U.S. Cl.
CPC ................ *B60T 8/94* (2013.01); *B60T 8/321* (2013.01); *B60T 8/74* (2013.01); *B60T 8/96* (2013.01);
(Continued)

(58) Field of Classification Search
CPC ... B60T 8/94; B60T 8/96; B60T 8/321; B60T 17/221
(Continued)

(56) References Cited

U.S. PATENT DOCUMENTS 6,149,248 A * 11/2000 Lubbers .................. B60T 7/042
188/358
6,212,459 B1 * 4/2001 Unterforsthuber ....... B60T 7/12
701/70
(Continued)

FOREIGN PATENT DOCUMENTS

CN 1488538 A 4/2004
DE 102008054853 A1 7/2010
(Continued)

OTHER PUBLICATIONS

International Search Report dated Jan. 27, 2017, of the corresponding International Application PCT/EP2016/074465 filed Oct. 12, 2016.

*Primary Examiner* — Peter D Nolan
*Assistant Examiner* — Luat T Huynh
(74) *Attorney, Agent, or Firm* — Norton Rose Fulbright US LLP; Gerard Messina

(57) ABSTRACT

A method for controlling a hydraulic braking system of a vehicle. The braking system includes a controllable first braking pressure generator and a sensor for a deceleration signal of the vehicle. The method includes: impressing a pressure characteristic with the aid of the first braking pressure generator on an original setpoint braking pressure; and monitoring the deceleration signal for the presence of a deceleration characteristic corresponding to the pressure characteristic.

18 Claims, 4 Drawing Sheets

(51) Int. Cl.
    *B60T 8/96*           (2006.01)
    *B60T 17/22*         (2006.01)
    *B60T 8/74*           (2006.01)

(52) U.S. Cl.
    CPC ......... *B60T 17/221* (2013.01); *B60T 2250/00* (2013.01); *B60T 2270/413* (2013.01)

(58) Field of Classification Search
    USPC .......................................................... 701/70
    See application file for complete search history.

(56) References Cited

U.S. PATENT DOCUMENTS

| | | | | |
|---|---|---|---|---|
| 6,457,785 | B1 * | 10/2002 | Yonemura | B60T 7/042 |
| | | | | 303/113.4 |
| 2011/0314806 | A1 * | 12/2011 | Ishizuka | B60T 13/745 |
| | | | | 60/545 |
| 2014/0350817 | A1 * | 11/2014 | Stein | B60T 8/17551 |
| | | | | 701/70 |
| 2015/0298670 | A1 * | 10/2015 | Ullrich | B60T 8/3655 |
| | | | | 303/155 |

FOREIGN PATENT DOCUMENTS

| | | |
|---|---|---|
| JP | H11268624 A | 10/1999 |
| JP | 2004098705 A | 4/2004 |
| JP | 2008055994 A | 3/2008 |
| JP | 2010018193 A | 1/2010 |
| JP | 2013086619 A | 5/2013 |
| JP | 2015093586 A | 5/2015 |

\* cited by examiner

METHOD AND CONTROL UNIT FOR CONTROLLING A HYDRAULIC BRAKING SYSTEM

FIELD OF THE INVENTION

The present invention relates to a method and control unit for controlling a hydraulic braking system.

BACKGROUND INFORMATION

The unexamined patent application DE 10 2008 054 853 A1 discusses a method for controlling or regulating an electromechanical brake booster of a hydraulic vehicle braking system. The invention provides an operation of an auxiliary force of the brake booster that is not solely a function of an actuating path or muscle power.

SUMMARY OF THE INVENTION

The present invention relates to a method for controlling a hydraulic braking system of a vehicle. The braking system includes a controllable first braking pressure generator, and a sensor for a deceleration signal of the vehicle. In the method according to the present invention, a pressure characteristic is impressed onto an original setpoint braking pressure with the aid of the first braking pressure generator. A deceleration signal of the vehicle is monitored for the presence of a deceleration characteristic corresponding to the pressure characteristic. A controllable first braking pressure generator may be understood to mean a controllable brake booster. A controllable brake booster may be present in the form of an electric, electromechanical, hydraulic, pneumatic or magnetic brake booster. Due to the fact that it is controllable, the braking pressure caused by the brake booster may be varied in a simple manner. A sensor for the deceleration signal may be understood to mean a sensor which directly measures the deceleration of the vehicle, i.e., an acceleration sensor. A first braking pressure generator may be understood to mean an actuator element, for example a plunger, or a pump, if necessary including a reservoir. The first braking pressure generator only has to be able to set its autonomous pressure in a braking system. Autonomous may be understood to mean that pressure in the braking system may be set at least partially driver-independently.

A deceleration signal may be understood to mean a signal which directly corresponds to a deceleration, but also a signal which has been post-processed, for example by forming a time derivative of the deceleration signal. Thus, a sensor for the deceleration signal may also be understood to mean an actual sensor connected to a downstream or integrated evaluation unit, which generates such a time derivative, for example. Advantageously, by monitoring whether the deceleration signal of the vehicle has a deceleration characteristic—corresponding to the impressed pressure characteristic—it may be easily decided whether a driving situation is present in which an adaptation of the present setpoint braking pressure is necessary. Such a driving situation may be caused, for example, by individual blocking wheels of the vehicle. Due to such a simple identification, a failure of a modulation unit, for example of an ESP/ABS system, may be compensated for by operating the first braking pressure generator. The method according to the present invention thus provides a redundant fallback level for handling situations critical for driving. This is important in particular with systems as they may be used in highly or semi-automated vehicles. In such systems, the driver is at least intermittently no longer directly involved in vehicle driving. When an ESP/ABS system, for example, fails in such systems, a driving-stabilizing brake intervention may automatically be carried out with the aid of the brake booster.

In one embodiment of the method, the impression of the pressure characteristic causes a change in the deceleration of the vehicle. Due to the fact that a change in the prevailing pressure of the braking system, which has a certain characteristic, also affects the deceleration of the vehicle, it is possible to monitor a deceleration characteristic corresponding to the pressure characteristic. This has the advantage that the braking pressure generated in the braking system may be plausibly isolated based on the prevailing deceleration signal. If the prevailing pressure in the braking system is plausible compared to the generated deceleration, in particular if the prevailing pressure characteristic is plausible compared to the prevailing deceleration characteristic, a normal driving situation is present. If the present deceleration characteristic deviates from the pressure characteristic, or if it is present in the deceleration signal in a changed form or no longer at all, a driving-critical situation may be inferred.

In one embodiment of the method, the original setpoint braking pressure is maintained when the corresponding deceleration characteristic is present. The pressure characteristic continues to be impressed. Since a non-critical driving situation may be inferred if a corresponding deceleration characteristic is present, an adaptation/change of the original setpoint braking pressure is not required.

It is furthermore advantageous that the original setpoint braking pressure is adapted when the corresponding deceleration characteristic is absent in the deceleration signal. In general, the original setpoint braking pressure is reduced. During the adaptation, in particular during the reduction, of the original setpoint braking pressure, the pressure characteristic continues to be impressed. By reducing the setpoint braking pressure, it is possible to counteract the blockage if blocking wheels of the vehicle are present, whereby the safety is improved in critical driving situations. By monitoring for a disappearance of the deceleration characteristic, it is easy to identify whether at least one of the wheels is blocking and to initiate appropriate measures.

Advantageously, the original setpoint braking pressure is reduced by a predefined pressure value. In this way, the reaction to critical driving situations may be predefined in a simple manner by establishing the magnitude by which the reduction is to take place. It is also possible, of course, for multiple pressure values by which the reduction is to take place to be stored in the form of a table as a function of present driving situations.

In one embodiment of the method, monitoring with respect to the deceleration characteristic takes place for a predefined first time interval after the deceleration signal has been reduced. By monitoring for the time duration of the first time interval, it is possible to decide after the same has elapsed as to how the taken measure, which is the reduced setpoint braking pressure here, affected the driving situation, and what further measures are necessary. In one advantageous embodiment, the braking pressure is increased again in the event that the deceleration characteristic is present again in the deceleration signal within the predefined first time interval; in this process, the pressure characteristic continues to be impressed as the braking pressure is being increased.

In the event that the deceleration characteristic continues to be absent in the deceleration signal within the predefined first time interval, the braking pressure is further reduced. The pressure characteristic continues to be impressed even during the further reduction. In this way, adequate measures—increasing the braking pressure again or further reducing the braking pressure—are used to adequately react to the present driving situation and safely brake the vehicle.

The braking pressure may advantageously be further reduced to a minimum value, in particular the minimum value corresponding to an amplitude of the impressed pressure characteristic. In this way, it may be ensured that no impermissibly low braking pressure is set in the system. Furthermore, it may be ensured that the pressure characteristic may continue to be impressed to the full extent.

If the deceleration characteristic is still not present again in the deceleration signal within a predefined second time interval, advantageously a pressure fixed value is set. This prevents the vehicle from driving too long with a reduced braking pressure and thereby increases the safety of the braking process. After a certain time, a safety braking pressure is thus set.

If the deceleration characteristic is present again after the first reduction of the braking pressure, the braking pressure is advantageously increased until the deceleration characteristic is again no longer present, until the original setpoint braking pressure has been reached or until a newly predefined setpoint braking pressure has been reached. In this way, the method may be adapted to new driving situations and, if necessary, to changed braking requirements.

Advantageously, the impression of the pressure characteristic takes place by a modulation of the braking pressure with the aid of the first braking pressure generator. The braking pressure generator present in the braking system may be used to impress the pressure characteristic. It is possible to generate a pressure characteristic in a simple manner when the first braking pressure generator is a controllable brake booster or a further braking pressure generator, provided it is able to control or set the braking pressure in the braking system.

In one embodiment, the modulation of the braking pressure is a cyclic modulation, in particular a cyclic modulation having a fixed frequency and/or a fixed amplitude. By providing a pressure characteristic in the form of a modulation having a fixed frequency and/or amplitude, a deceleration characteristic corresponding to the pressure characteristic may be easily detected and monitored in the deceleration signal.

It is furthermore advantageous that the deceleration characteristic is present in the form of a frequency of the deceleration signal, the frequency of the deceleration characteristic essentially corresponding to the frequency of the pressure characteristic. As an alternative or in addition, the deceleration characteristic may be present in the form of an amplitude of the deceleration signal, or in the form of an amplitude change of the deceleration signal. In this way, the deceleration characteristic may be easily correlated with the impressed pressure characteristic. In addition, an amplitude or an amplitude change may be easily identified, and thus a signal may be monitored for the presence of a deceleration characteristic.

In one embodiment of the present invention, the impression of the pressure characteristic is dispensed with or the impression is interrupted when the vehicle speed is at or drops below a speed limiting value, in particular when the vehicle is at a standstill. Below a certain limiting value, a modulation of the braking pressure may no longer be identified in the deceleration signal, which is also why a modulation of the braking pressure is suppressed.

In one advantageous embodiment, the hydraulic braking system includes a further braking pressure generator. The impression of a pressure characteristic with the aid of the first braking pressure generator is started when a failure of the further braking pressure generator is present. A redundant braking system is thus provided, which provides a further option for reacting to blocking wheels independently of the second braking pressure generator, in general an ESP/ABS unit. In this way, the present braking system satisfies the requirement of a possible safe braking process during autonomous/semi-automated driving by utilizing the hardware redundancy for active braking pressure generation, on the one hand using the first braking pressure generator (brake booster) and, on the other hand, with the aid of the second braking pressure generator (ESP/ABS system).

A defect of the further braking pressure generator—for example in the form of a modulation unit for modulating the wheel braking pressure—may be present in the form of a defect in components of the modulation unit. If the modulation unit fails entirely or at least partially, the functionality may be assumed by the first braking pressure generator, which in turn increases the safety.

In one embodiment of the present invention, the deceleration signal is a signal which directly represents the deceleration of the vehicle or a time derivative of the deceleration of the vehicle. In this way, two signals are available, which are able to include the deceleration characteristics and may be used separately, but also together, for monitoring with respect to the deceleration characteristic, which increases the accuracy and, in turn, creates redundancy in the system.

The method, as described above, may be carried out with the aid of a control unit, which includes an arrangement or control unit for carrying out the method as provided herein.

DETAILED DESCRIPTION

Figure 2:
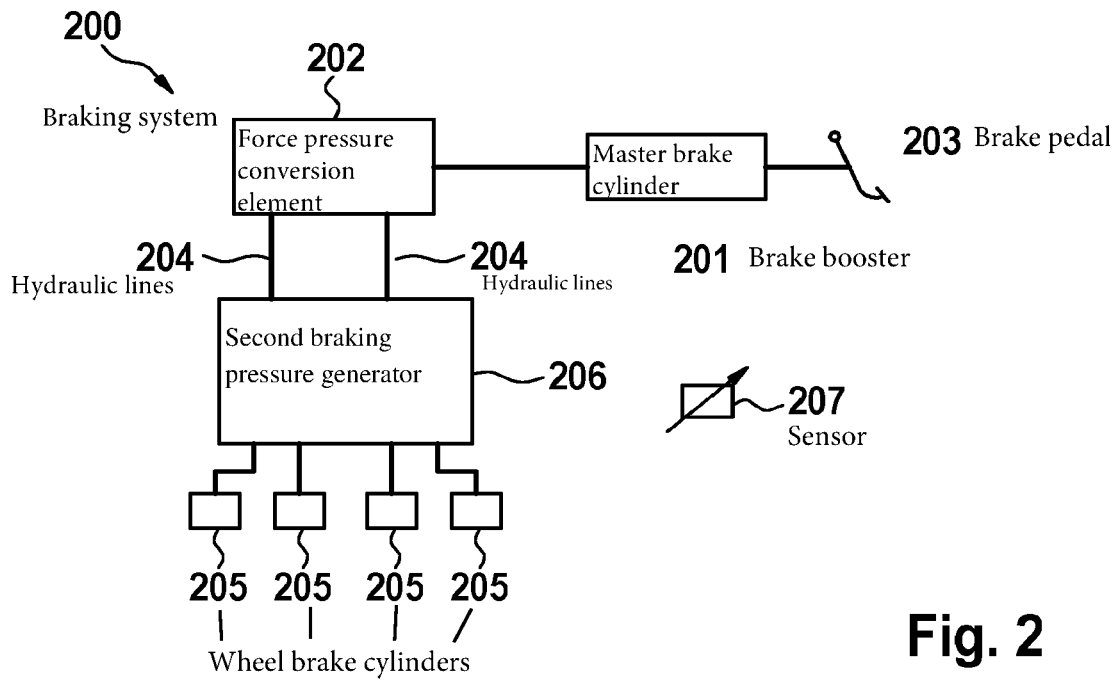
FIG. 2 shows a schematic representation of a hydraulic braking system.

First, braking system 200 is described, which is illustrated in FIG. 2. The braking system includes at least one wheel brake cylinder 205, to which a braking pressure may be hydraulically applied. Due to the pressure build-up in wheel brake cylinder 205, a deceleration of the corresponding wheel may be achieved in the known manner.

Hydraulic braking system 200 furthermore includes a brake booster 201, which is able to apply a force to a force pressure conversion element 202. Such a force pressure conversion element may be present in the form of a master brake cylinder 202. Known master brake cylinders include two pressure chambers, for example.

Brake booster 201 is able to autonomously set the output force of brake booster 201. This may take place, for example, by a change in the boost factor of brake booster 201. When the brake booster changes its output force, a different force is also applied to master brake cylinder 202, so that a different pressure is set in the chambers of master brake cylinder 202. In this way, the brake booster may be understood as a first braking pressure generator 201. Brake booster 201 moreover has the property of being controllable. Controllable shall be understood to mean that it is possible to vary the output force of the brake booster, for example by an appropriate control unit. Such a brake booster may be an electromechanical, electromagnetic, electrohydraulic or also controllable pneumatic brake booster.

The brake booster may furthermore include a coupling option for a brake pedal 203, so that a driver may effectuate a pressure build-up in the hydraulic braking system by actuating the brake pedal, in addition to brake booster 201. It must be emphasized, however, that this is not absolutely necessary. Also conceivable are hydraulic braking systems in which the brake boost and the pedal actuation are present separately, in particular systems in which the driver—at least during normal operation—does not contribute to the braking pressure build-up via the brake pedal, but rather actuates a pedal simulator.

The at least one pressure chamber of master brake cylinder 202 is hydraulically connected to wheel brake cylinders 205. This hydraulic connection takes place via hydraulic lines 204. The number of hydraulic lines 204 depends on the number of the pressure chambers of the master brake cylinder. In the example shown in FIG. 2, two hydraulic lines 204 are shown, which are assigned to two pressure chambers of master brake cylinder 202. A modulation unit 206 may be situated between master brake cylinder 202 and wheel brake cylinders 205. Such a modulation unit may be present in the form of an ABS and/or ESP hydraulic power unit. Such modulation units are generally able to modulate, in particular to increase or reduce, wheel braking pressure on individual wheel brake cylinders 205. Such a modulation unit may be understood as a further or as a second braking pressure generator 206.

Hydraulic braking system 200 furthermore includes a sensor 207 which is able to output a deceleration signal 303 of the vehicle. A deceleration signal 303 may be a voltage or a current, for example, whose level corresponds to an instantaneously present deceleration of the vehicle. Sensor 207 could also output a signal which is proportional to the time derivative of the deceleration.

One specific embodiment of the method is described hereafter.

It shall be assumed that an original setpoint braking pressure is already set in the braking system.

In first step 1 of the method, a pressure characteristic is impressed onto the original setpoint braking pressure with the aid of first braking pressure generator 201. The impression of a pressure characteristic on the original setpoint braking pressure may be understood to mean a modulation of the braking pressure by first braking pressure generator 201. Such a modulation takes place, for example, by a change in the output force provided on the part of the first braking pressure generator. Due to the modulation of the output force of braking pressure generator 201, the braking pressure in hydraulic braking system 200 is modulated accordingly. In the case of a brake booster 201, this brake booster applies the output force to a master brake cylinder 202.

Such a modulation of the braking pressure may be a cyclic modulation. A cyclic modulation may be understood to mean that the braking pressure is increased and reduced again in a regular sequence. The modulation may take place cyclically at a predefined frequency. An implementation of a cyclic modulation may take place, for example, in the form of a sinusoidal change in the output force of the first braking pressure generator, for example of brake booster 201.

Such a modulation may take place, for example, with the aid of a frequency of less than 10 Hz, in particular a frequency of less than or equal to 7 Hz. It has proven particularly advantageous to use frequencies of 3 Hz or 6 Hz since these frequencies may be separated from other frequencies caused, for example, by the axle vibration frequencies of the vehicle, which are typically in the range of more than 8 Hz. The amplitude level of the modulation of the braking pressure is selected in such a way that the vehicle has a measurable reaction in deceleration signal 303.

In other words, a cyclic modulation of the output force of braking pressure generator 201 generates a pressure characteristic at which the braking pressure is also cyclically changed.

A braking pressure prevailing in at least one wheel brake cylinder 205 of hydraulic braking system 200 effectuates a braking torque in the known manner, which effectuates a deceleration of the vehicle. The degree of the deceleration is measurable with the aid of a sensor 207. Such a sensor 207 may be an acceleration sensor, which is able to ascertain the prevailing braking deceleration.

Sensor 207 generates a deceleration signal corresponding to the deceleration of the vehicle. As was already illustrated, a braking pressure results in a deceleration. Also, a modulation of the braking pressure results in a modulation of the vehicle deceleration. This modulation is measurable with the aid of sensor 207 in the form of a deceleration signal.

The pressure characteristic impressed on the braking pressure may be identified in the deceleration signal as a deceleration characteristic. Such an identification may take place in that a frequency of the pressure characteristic, in particular of the modulation of the braking pressure, may essentially be identified in the deceleration signal.

In a further step of method 2, the deceleration signal is monitored for the presence of a deceleration characteristic corresponding to the pressure characteristic. If the characteristic is monitored in the form of a frequency, for example, a monitoring unit is able to check whether or not the deceleration signal has a certain frequency and generate a corresponding signal. In addition to a monitoring for the presence of a frequency, it is possible, of course, to monitor a certain frequency band. As an alternative or in addition, an amplitude of the deceleration signal may be monitored. The monitoring of the amplitude may take place with respect to an amplitude change.

In one embodiment of the method, a frequency band of the deceleration signal to be monitored may be selected in such a way that it essentially corresponds to the frequency of the pressure characteristic.

If the presence of the deceleration characteristic in the deceleration signal is established, in step 3 the original setpoint braking pressure is maintained. The impression of the pressure characteristic is continued. The method continues in step 1.

If an absence of the deceleration characteristic in the deceleration signal is established, in step 4 the original setpoint braking pressure is adapted. An adaptation takes place by a reduction in the braking pressure.

During the reduction of the braking pressure, furthermore a pressure characteristic is impressed by first braking pressure generator 201. An absence of the deceleration characteristic may involve that the frequency of the pressure characteristic is no longer identifiable in the deceleration signal. Furthermore, an absence of the deceleration characteristic may be ascertained by identifying a change in the amplitude in the deceleration characteristic.

A reduction in the braking pressure may take place in that the original setpoint braking pressure is reduced by a predefined pressure value. The predefined pressure value by which the reduction is to take place may either be fixedly stored, or it may also be stored in a value table or value matrix, in which a predefined pressure value is assigned to different driving situations, as a function of driving parameters (speed, acceleration, deceleration, slope, steering angle) or ambient values (temperature, roadway condition). The reduction of the braking pressure also takes place with the aid of first braking pressure generator 201, for example with the aid of brake booster 201. A possible implementation of a pressure reduction, which however is clearly dependent on the present braking system and vehicle type, may be in the range of a reduction by 40% of the instantaneous average pressure value.

A reduction by at least 15 bar may take place, for example, however only to a certain lower limit, which essentially corresponds to the amplitude of the pressure modulation.

After the braking pressure has been reduced by the predefined pressure value, it is monitored in step 5 whether the deceleration signal again has the deceleration characteristic corresponding to the pressure characteristic within a predefined first time interval. The predefined time interval may be in the range of multiple modulation cycles, in particular of 1 to 2 modulation cycles.

If it is established within the predefined time interval that the deceleration characteristic is present again in the deceleration signal, in step 6 the braking pressure is again returned to the instantaneously present setpoint braking pressure of the braking system. This setpoint braking pressure may either be the initially present setpoint braking pressure of the braking system, but alternatively may also be a new setpoint braking pressure deviating therefrom. The impression of a pressure characteristic by first braking pressure generator 201 is continued. The method then starts again in step 1 with the monitoring of the deceleration signal.

In step 7, the braking pressure is further reduced in the event that the deceleration signal does not include the deceleration characteristic within the first time interval. A pressure characteristic continues to be impressed on the braking pressure during the reduction thereof.

The further reduction of the braking pressure may take place down to a minimum value, i.e., to a minimum pressure. The minimum pressure may correspond to an amplitude of the pressure characteristic. During the reduction, the deceleration signal continues to be monitored for the deceleration characteristic.

In the event that, after or during the further reduction of the braking pressure, still no deceleration characteristic is present, a predefined braking pressure is set in step 8. This predefined braking pressure may also be understood as a pressure fixed value. Setting such a pressure fixed value guarantees that the braking pressure does not remain fully reduced to the minimum value, but that a braking effect is again present in the braking system. This is a property that increases the safety of the hydraulic braking system.

The pressure increase to the pressure fixed value may take place after a predefined second time interval. The predefined second time interval is in the order of magnitude of seconds, in particular 1.5 to 2 seconds.

Figure 1:
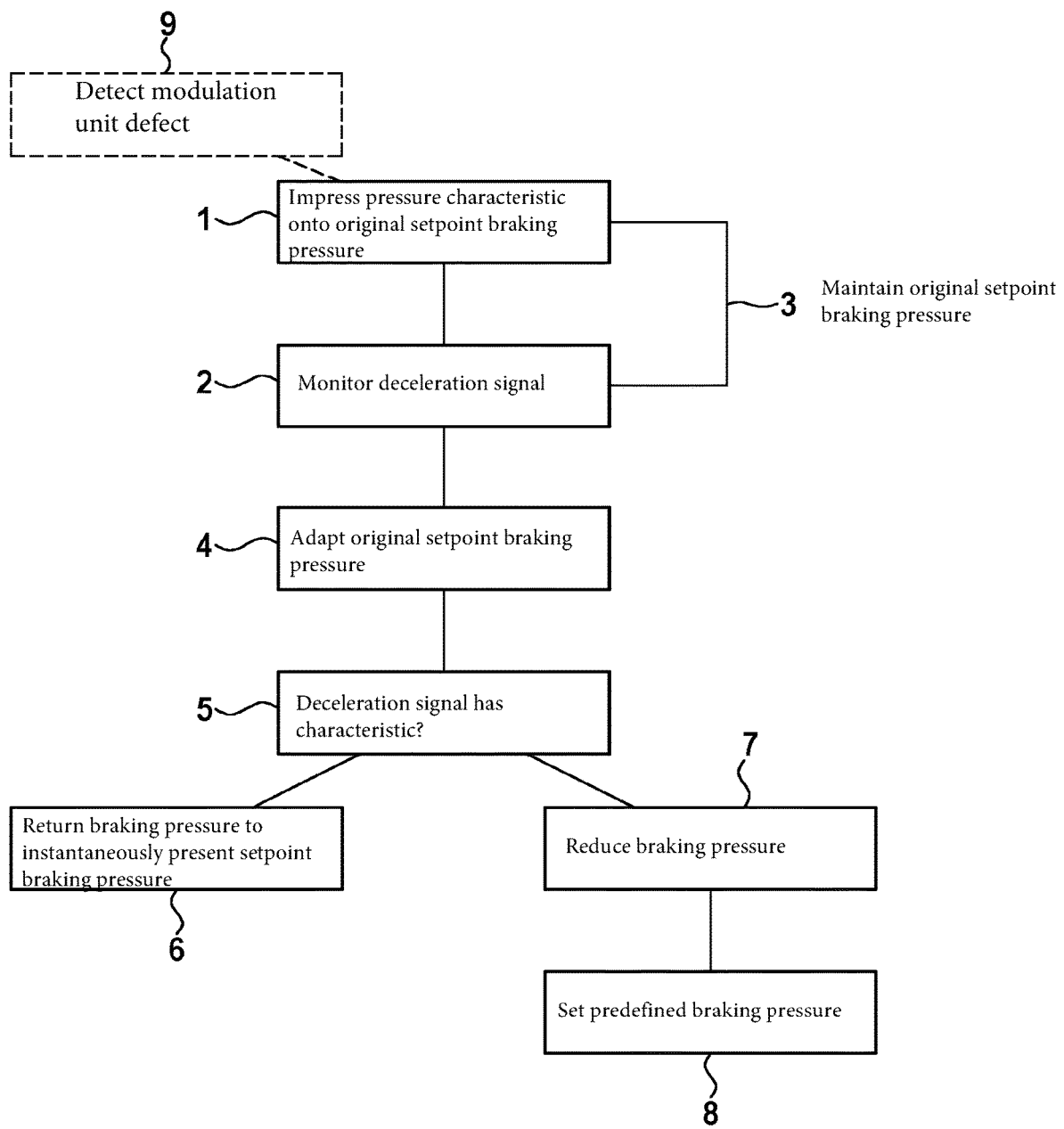
FIG. 1 shows a schematic representation of the method.

In an alternative embodiment (not shown in FIG. 1), the braking pressure may also be continuously reduced, the pressure characteristic continuing to be impressed during the reduction. The reduction may take place until the still monitored deceleration signal has the deceleration characteristic again. A reduction until a minimally permissible pressure value is reached is also conceivable.

A step 9, which initiates the method, may take place before steps 1 to 8. Step 9 may include the detection of a defect in a modulation unit 206 of hydraulic braking system 200. If such a defect is detected, for example a failure in the hydraulic power unit of modulation unit 206, in assigned sensors or signal lines, a vehicle-stabilizing regulation with the aid of modulation unit 206 is no longer possible.

Figure 3:
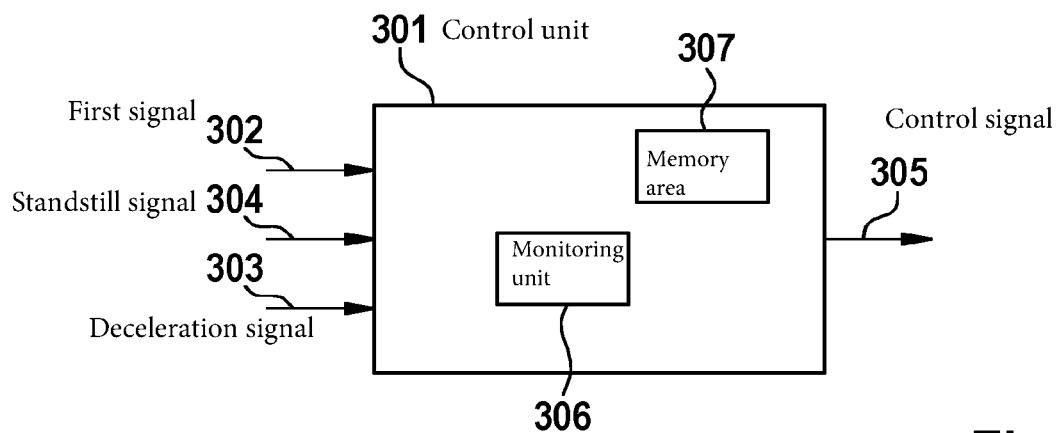
FIG. 3 shows a schematic representation of the control unit and of the associated signals.

FIG. 3 schematically shows a control unit 301. A control unit may also be understood to mean a control unit module; it is not necessary for a completely autonomous control unit to be present for the method which is carried out. A sub-unit of an existing control unit of hydraulic braking system 200 may also carry out the steps of the method—entirely or at least partially. Such a control unit 301 may be a control unit of the second braking pressure generator, in particular of modulation unit 206. Control unit 301 may also be a control unit of the first braking pressure generator, in particular of brake booster 201. Sub-functions may also be distributed between the braking pressure generator control unit and the modulation unit control unit. It may quite possibly be useful for the activation of the brake booster for the impression of the pressure characteristic to be carried out by the brake booster control unit, while the deceleration signal is monitored on part of the modulation unit control unit. The control units may communicate with one another wirelessly or also by wire via CAN or BUS systems.

For the sake of simplicity, one control unit 301 is assumed hereafter.

Control unit 301 is able to receive signals. A first signal 302 represents an error in modulation unit 206. Such an error may exist in the form of defective components of modulation unit 206, in particular of the hydraulic power unit of modulation unit 206. An error may also be present in defective assigned sensors or signal lines to such sensors. The sensors may be speed sensors on the wheels of the vehicle.

Control unit 301 is able to receive a deceleration signal 303. Deceleration signal 303 is provided by sensor 207, either directly or indirectly.

The control unit monitors deceleration signal 303 for the presence of the deceleration characteristic, as was already described.

For this purpose, the control unit includes a monitoring unit 306. With the aid of monitoring unit 306 of control unit 301, the deceleration signal is monitored. As was already described, monitoring unit 306 may monitor deceleration signal 303 for at least one certain frequency, amplitude and/or amplitude change. Monitoring for at least one frequency band may also take place. Monitoring unit 306 may also be provided with the frequency (not shown) with the aid of which the pressure characteristic is impressed by brake booster 201. In this way, the suitable frequency or the suitable frequency band may be monitored.

Control unit 301 also provides a control signal 305, which is used to activate brake booster 201. This may control brake booster 201 directly or indirectly via a further control unit.

With the aid of control signal 305 of control unit 301, it is possible, as was already described for the method steps, to maintain the braking pressure, reduce the braking pressure or increase the braking pressure again, for example. The control signals required to do so may be included in control signal 305. The braking pressure to be set may also be understood to mean the instantaneously provided setpoint braking pressure of the braking system.

Control unit 301 furthermore includes a memory area 307 in which predefined variables of the method are stored. Predefined variables may be stored in the form of:
- a frequency to be set for the pressure characteristic;
- a predefined pressure value for the reduction of the braking pressure;
- a predefined first time interval, and/or
- a predefined second time interval.

A standstill signal 304 may be provided to control unit 301, which indicates that the vehicle is at a standstill, or at least below a certain speed. This standstill signal 304 may be used to abort the method. Abortion shall be understood to mean that the pressure characteristic is no longer impressed and/or the deceleration signal is no longer monitored. At a standstill—or at least below a certain speed—an impressed pressure characteristic will no longer be identifiable in the deceleration signal, thus it may be necessary to abort the method.

Figure 4:
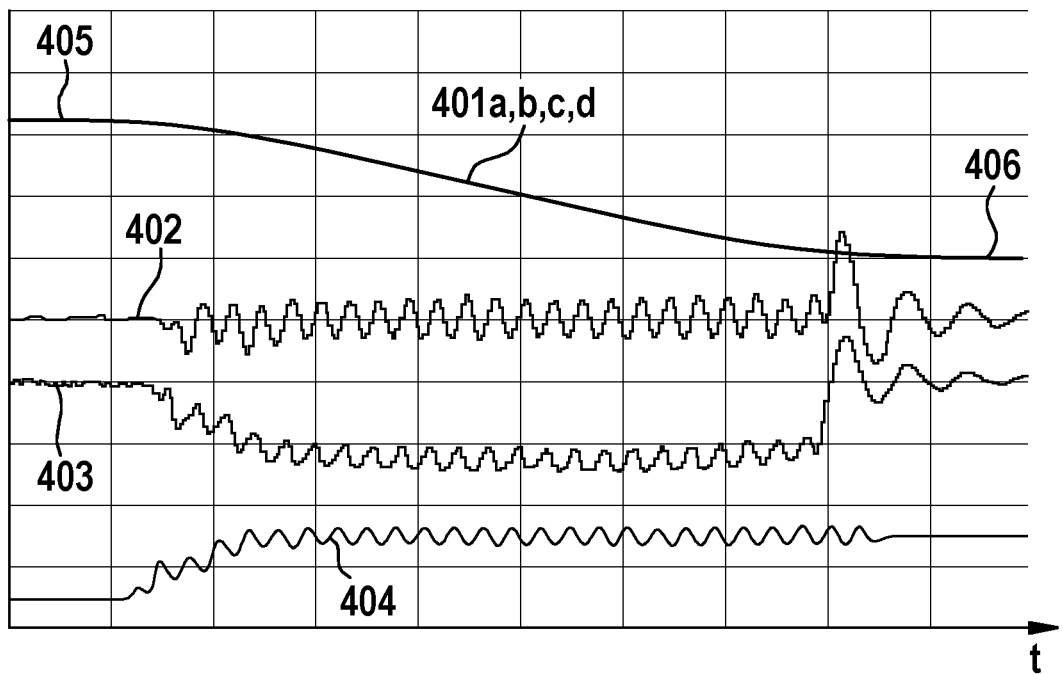
FIGS. 4, 5 and 6 show typical signal curves of wheel speeds, of the pressure signal, of the deceleration signal and of the jerk of the first time derivative of the deceleration signals.
Figure 5:
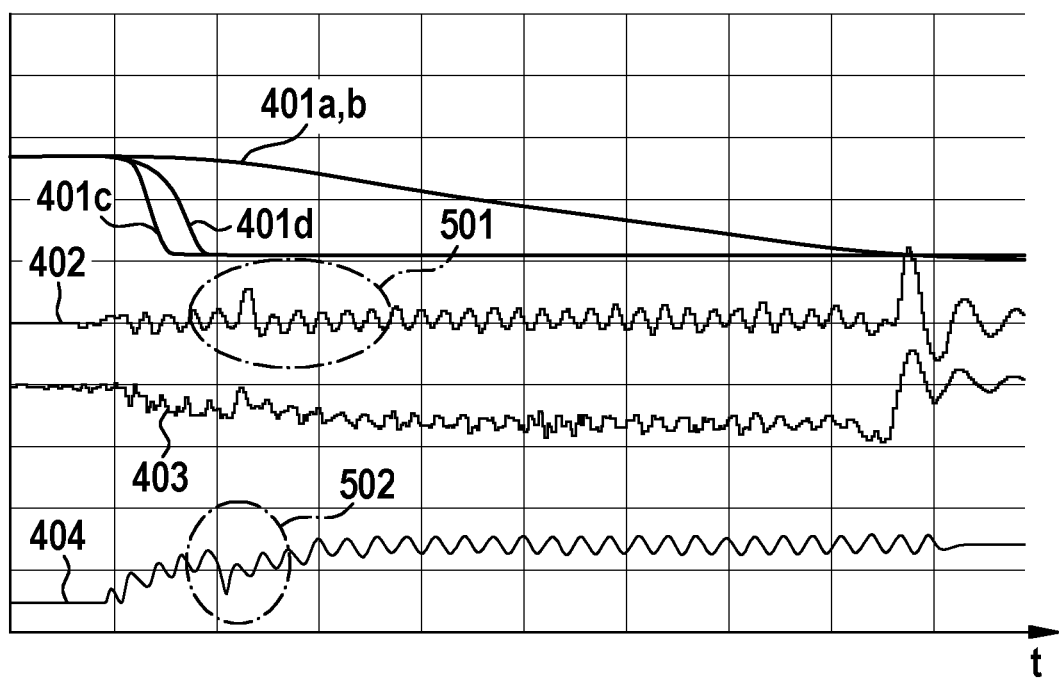
Figure 6:
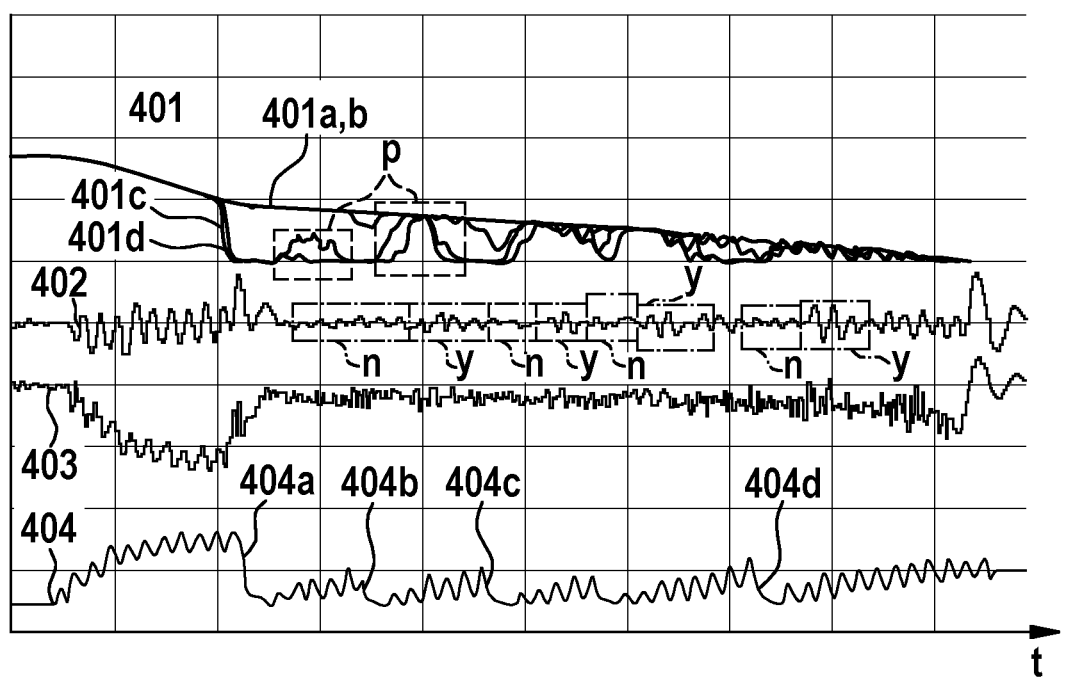

FIG. 4 shows four signal curves. A first signal curve 401 shows wheel speeds of four wheels of the motor vehicle. The wheel speeds are shown in FIGS. 4 through 6 only for comprehension; they do not form part of the control loop.

Wheel speeds may also be understood to mean wheel velocities. A distinction between the four wheel velocities 401a, b, c, d is not initially visible in the drawings since, in this case of a present brake application, none of the wheels are blocking, and all have the same wheel velocities. The signals progress essentially the same. Based on signal curves 401a through d, it is apparent that all wheel velocities are reduced from an initial level 405 to an end level 406. For example, 406 may represent a wheel velocity which corresponds to the standstill of the vehicle. All signal curves are shown on the axis of the diagram from left to right with increasing time t.

Signal 403 represents the present vehicle deceleration.

This is plotted here as acceleration. Acceleration and deceleration, however, are correlated variables, the deceleration being the negative acceleration. The vehicle deceleration increases over time from a first level, deceleration signal 403 correspondingly decreasing.

Signal 404 shows the signal curve of a wheel braking pressure. The wheel braking pressure is being modulated. This is apparent from signal curve 404. The wheel braking pressure increases over the course of the present brake application from a first level over time. Wheel braking pressure 404 shows a prevailing modulation which is impressed on the wheel braking pressure.

This modulation is also apparent in vehicle deceleration signal 403, here in the form of a sinusoidal modulation.

Another signal 402 shows the so-called jerk. The jerk corresponds to a derivative of the vehicle deceleration. A derivative shall be understood to mean a time derivative (d/dt) of the vehicle deceleration. Since the vehicle deceleration has said modulation, a modulation is also apparent in the jerk by forming the time derivative of the vehicle deceleration. The braking progression shown in FIG. 4 corresponds to a normal brake application, for example on dry asphalt.

Both pure deceleration signal 403 and the signal of vehicle jerk 402 may be understood as a deceleration signal, which is monitored for the deceleration characteristic—as described above.

FIG. 5, in contrast, shows a different brake application. At the beginning of the brake application, all wheel velocities 401 a through d are at the same level. Then a situation occurs in which two of the wheels begin to block. A blockage of the wheels may be identified by a decrease in the wheel velocity. In particular, a decrease in the wheel velocity to zero may be identified. Signal curves 401c and 401d show such a decrease in the wheel velocities of two corresponding wheels.

A deceleration characteristic 501 is apparent on the signal of jerk 402 when wheels are blocking. A deceleration characteristic 501 may be understood in the form of a smaller amplitude—compared to an expected amplitude with a regular brake application—of jerk signal 402. Further characteristic changes in the deceleration signal, i.e., jerk signal 402 in this case, which corresponds to a time derivative of deceleration signal 403, may also be assigned for identifying a situation which corresponds to blocking wheels.

If a deceleration characteristic 501 is identified, the wheel braking pressure is reduced. A reduction in the wheel braking pressure is apparent in the wheel pressure signal, which in FIG. 5 is in the marked area 502.

In one alternative further specific embodiment, it may be provided to couple a reduction of the wheel braking pressure to a further reduction criterion. The driving stability presently prevailing in the driving situation may represent a reduction criterion.

After a reduction in the wheel braking pressure—apparent in the signal of wheel brake pressure 404 in area 502—the wheel braking pressure is raised again. It may be provided that a new overall setpoint deceleration is predefined when a deceleration characteristic 501, combined with a reduction in the wheel braking pressure, is identified. This predefinition may take place in the form of a setpoint braking pressure to be newly set. It is also apparent from signal curve 404 that the modulation of the wheel braking pressure is continued with a reduction in the wheel braking pressure.

FIG. 6 shows a further brake application. During this brake application, a transition from a dry roadway, for example, onto a slippery roadway, in particular an icy or wet roadway, takes place.

At the beginning of the brake application, it is apparent that the wheel velocities of all involved wheels have the same progression in signal curve 401. Wheel braking pressure 404 increases and—as was already described—has the modulation.

The vehicle deceleration increases, as may be seen in the signal curve of deceleration signal 403. Signal 403 corresponding to the deceleration also shows the modulation. Furthermore, the signal of jerk 402 also shows the modulation. As mentioned above, jerk 402 is the time derivative of deceleration signal 403. When the vehicle reaches a slippery surface, individual wheels may block. This is apparent from wheel velocity signals 401c and 401d, which leave the original value of the wheel velocity during the brake application and, as is shown here, decrease to zero, for example. The curves of the other wheel velocity signals 401 a and b remain as expected. As described above, a blockage of individual wheels is also apparent based on a change in the deceleration characteristic. If the deceleration characteristic is monitored based on the signal of jerk 402, the signal may be divided into areas in which a characteristic is present, and into areas in which the characteristic is not present. In signal 402, areas are marked with the letter n, in which the deceleration characteristic is not apparent. Areas are also marked with the letter y, in which the deceleration characteristic is visible again.

A presence of a frequency and/or an amplitude, and the change of the amplitude, may be used to monitor for the presence of the deceleration characteristic. Areas y and n may differ in the frequency and/or amplitude, and in the change of the amplitude.

Whenever the deceleration characteristic is no longer present in signal 402, the wheel braking pressure is reduced. This is apparent by way of example in signal 404 in locations 404a, 404b, 404c and 404d. If the deceleration characteristic is apparent again in the signal of jerk 402 (areas y), the wheel braking pressure is increased again, and the modulation is impressed. This is apparent based on signal 404 in the areas between locations 404 a, b, c and d. Situations in which jerk signal 402 has a deceleration characteristic again (markings y) may be assigned driving situations in which the wheels no longer block. This is the case, for example, in wheel velocity signal 401 in locations marked with p.

It is also possible to use deceleration signal 403 instead of the signal of jerk 402 for analyzing the present driving situations. If the deceleration signal has strong changes, this may also be used as an indication of blocking wheels, for example. It is also possible to monitor deceleration signal 403 and the signal of jerk 402 together to gain a better understanding of the present driving situation.

It is also apparent from FIGS. 4, 5 and 6 that the pressure modulation on the present wheel braking pressure is terminated when a wheel velocity is no longer present, i.e., when the vehicle is at a standstill or the vehicle is almost at a standstill. This may be seen with pressure signal 404 ending to the right, which no longer shows the present modulation.

Driving situations in which individual wheels of the vehicle block may be reliably identified by monitoring the deceleration characteristic. With the aid of the method according to the present invention, the wheel braking pressure is adapted using first braking pressure generator 201, i.e., using the brake booster. In this way, reliable brake application of the vehicle may be ensured even in the event of a defect of a modulation unit of the braking system.

It must be emphasized that the use of the terms brake booster and modulation unit is not considered to be exhaustive. It is sufficient when the roles described in this application in a braking system are handled by two different autonomous braking pressure generators, i.e., with the aid of a first and a second braking pressure generator. In this way, both a combination of a traditional brake booster in combination with an ESP hydraulic unit, and an integrated braking system including a plunger and an additional braking pressure source, may be understood to be within the scope of the present invention.

What is claimed is:

1. A method for controlling a hydraulic braking system of a vehicle, the braking system including a controllable first braking pressure generator and a sensor for a deceleration signal of the vehicle, the method comprising:
   impressing a pressure characteristic with the aid of the first braking pressure generator on an original setpoint braking pressure; and
   monitoring the deceleration signal for the presence of a deceleration characteristic corresponding to the pressure characteristic, wherein the original setpoint braking pressure is adapted, when the corresponding deceleration characteristic is absent or the deceleration characteristic changes, the pressure characteristic continuing to be impressed during the adaptation of the original setpoint braking pressure.

2. The method of claim 1, wherein the impression of a pressure characteristic causes a change in the deceleration of the vehicle.

3. The method of claim 1, wherein the original setpoint braking pressure is maintained when the corresponding deceleration characteristic is present, the pressure characteristic continuing to be impressed.

4. The method of claim 1, wherein the original setpoint braking pressure is reduced by a predefined pressure value.

5. The method of claim 1, wherein monitoring with respect to the deceleration characteristic takes place for a predefined first time interval after the deceleration signal has been reduced.

6. The method of claim 5, wherein the braking pressure is increased again when the deceleration characteristic is present again in the deceleration signal within the predefined first time interval.

7. The method of claim 5, wherein the braking pressure is further reduced when the deceleration characteristic is not present in the deceleration signal within the predefined first time interval.

8. The method of 7, wherein the braking pressure is further reduced down to a minimum value.

9. The method of claim 8, wherein a pressure fixed value is set if the deceleration characteristic is not present in the deceleration signal within a predefined second time interval.

10. The method of claim 7, wherein the braking pressure is increased until:
    the deceleration characteristic is again no longer present;
    the original setpoint braking pressure has been reached; or
    a newly predefined setpoint braking pressure has been reached.

11. The method of claim 1, wherein the impression of the pressure characteristic takes place by a modulation of the braking pressure with the first braking pressure generator.

12. The method of claim 1, wherein the deceleration signal corresponds to a deceleration of the vehicle or a time derivative of the deceleration of the vehicle.

13. A method for controlling a hydraulic braking system of a vehicle, the braking system including a controllable first braking pressure generator and a sensor for a deceleration signal of the vehicle, the method comprising:
    impressing a pressure characteristic with the aid of the first braking pressure generator on an original setpoint braking pressure; and
    monitoring the deceleration signal for the presence of a deceleration characteristic corresponding to the pressure characteristic, wherein the impression of the pressure characteristic takes place by a modulation of the braking pressure with the first braking pressure generator, and wherein the modulation is a cyclic modulation.

14. The method of claim 13, wherein the deceleration characteristic is present in the form of:
    a frequency of the deceleration signal, the frequency of the deceleration characteristic essentially corresponding to the frequency of the pressure characteristic;
    an amplitude of the deceleration signal; or
    an amplitude change of the deceleration signal.

15. The method of claim 13, wherein the further braking pressure generator is a modulation unit for modulating the wheel braking pressure, and the failure represents a defect in components of the modulation unit.

16. A method for controlling a hydraulic braking system of a vehicle, the braking system including a controllable first braking pressure generator and a sensor for a deceleration signal of the vehicle, the method comprising:
    impressing a pressure characteristic with the aid of the first braking pressure generator on an original setpoint braking pressure; and monitoring the deceleration signal for the presence of a deceleration characteristic corresponding to the pressure characteristic, wherein the impression of the pressure characteristic is dispensed with or is aborted when the vehicle speed is at or drops below a speed limiting value, in particular when the vehicle is at a standstill.

17. A method for controlling a hydraulic braking system of a vehicle, the braking system including a controllable first braking pressure generator and a sensor for a deceleration signal of the vehicle, the method comprising:
   impressing a pressure characteristic with the aid of the first braking pressure generator on an original setpoint braking pressure; and
   monitoring the deceleration signal for the presence of a deceleration characteristic corresponding to the pressure characteristic, wherein the hydraulic braking system includes a further braking pressure generator, and the impression of a pressure characteristic with the aid of the first braking pressure generator is started when a failure of the further braking pressure generator is present.

18. A control unit, comprising:
   a controller configured for controlling a hydraulic braking system of a vehicle, the braking system including a controllable first braking pressure generator and a sensor for a deceleration signal of the vehicle, by performing the following:
   impressing a pressure characteristic with the aid of the first braking pressure generator on an original setpoint braking pressure; and
   monitoring the deceleration signal for the presence of a deceleration characteristic corresponding to the pressure characteristic, wherein the original setpoint braking pressure is adapted, when the corresponding deceleration characteristic is absent or the deceleration characteristic changes, the pressure characteristic continuing to be impressed during the adaptation of the original setpoint braking pressure.

* * * * *